(12) United States Patent
Areh et al.

(10) Patent No.: US 6,860,196 B2
(45) Date of Patent: Mar. 1, 2005

(54) JUICER

(75) Inventors: Marko Areh, Radlje Ob Dravi (SI); Peter Brezovnik, Mozirje (SI); Siegmund Kramer, Kirchanschöring (DE); Stanislav Mazej, Gomilsko (SI); Henrik Pavlovic, Ljubno Ob Savinji (SI); Michael Steffl, Marquartstein (DE); Igor Zibret, Smartno Ob Paki (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 0 days.

(21) Appl. No.: 10/791,595

(22) Filed: Mar. 1, 2004

(65) Prior Publication Data

US 2004/0187710 A1 Sep. 30, 2004

Related U.S. Application Data

(63) Continuation of application No. PCT/EP02/09402, filed on Aug. 23, 2002.

(51) Int. Cl.⁷ .............................. A23L 1/00; A23N 1/00; A23N 1/02; A47J 19/02; B02C 18/12
(52) U.S. Cl. .......................................... 99/502; 99/501
(58) Field of Search ................. 99/348, 357, 501–508, 99/495, 492, 485, 486, 509–513; 241/101.01, 37.5, 92, 101.2

(56) References Cited

U.S. PATENT DOCUMENTS

| | | | |
|---|---|---|---|
| 1,509,981 A | * 9/1924 | Rice | 99/508 |
| 1,533,208 A | 4/1925 | Pursell | |
| 1,563,413 A | * 12/1925 | Whitcomb | 99/508 |
| 1,949,675 A | * 3/1934 | Bush | 99/507 |
| 2,003,259 A | * 5/1935 | Gilbert et al. | 99/484 |
| 2,074,708 A | * 3/1937 | Smith | 74/75 |
| 2,176,377 A | * 10/1939 | Gamble | 99/508 |
| 2,269,853 A | * 1/1942 | Knapp | 99/501 |
| 2,315,018 A | * 3/1943 | Lawrence | 99/501 |
| 4,240,338 A | * 12/1980 | McClean | 99/501 |
| 4,309,942 A | * 1/1982 | Da Silva, Jr. | 99/501 |
| 5,193,447 A | * 3/1993 | Lucas et al. | 99/508 |
| 5,355,784 A | * 10/1994 | Franklin et al. | 99/492 |
| 6,363,837 B1 | * 4/2002 | Sham et al. | 99/348 |

FOREIGN PATENT DOCUMENTS

| | | |
|---|---|---|
| DE | 1 187 349 | 2/1965 |
| DE | 1 940 644 | 6/1966 |
| DE | 27 48 683 A1 | 5/1979 |
| EP | 0 362 058 B1 | 4/1990 |

* cited by examiner

*Primary Examiner*—Timothy F. Simone
(74) *Attorney, Agent, or Firm*—Laurence A. Greenberg; Werner H. Stemer; Ralph E. Locher

(57) ABSTRACT

A juicer is driven by an electric motor. The juicer is provided with a centrally-arranged, projecting, upwardly-tapering element, for the pressing of a fruit. The pressing element may be driven by a driveshaft, connected to the element. The driveshaft may be displaced in the axial direction. By pressing downwards on the element, the driveshaft is pressed against a switching means and the electric motor switched on thereby.

10 Claims, 1 Drawing Sheet

JUICER

CROSS-REFERENCE TO RELATED APPLICATION

This application is a continuation, under 35 U.S.C. § 120, of copending international application No. PCT/EP02/09462, filed Aug. 23, 2002, which designated the United States; this application also claims the priority, under 35 U.S.C. § 119, of German patent application No. 101 42 507.4, filed Aug. 30, 2001; the prior applications are herewith incorporated by reference in their entirety.

BACKGROUND OF THE INVENTION

Field of the Invention

The present invention relates to a fruit juicer or fruit pressing device that is driven by an electromotor with a centrally-arranged, projecting, upwardly-tapering element for the pressing of a fruit. The cone-like element can be driven by the electromotor via a drive shaft connected to the element.

European patent EP 0 362 058 B1 discloses a fruit juicer of that type. The juicer is driven by an electromotor. There, the motor drives a shaft via a toothed belt and via belt pulleys. The juicer together with a cone-like, centrally projecting, and upwardly tapering element is disposed at the upper end of the shaft.

The prior art motorized juicers are switched on either by the user actuating a switch, so that the electromotor starts up, or when the user applies pressure to the press element which forces a lever mechanism and toothed wheels to switch on the motorized juicer.

SUMMARY OF THE INVENTION

It is accordingly an object of the invention to provide a fruit juicer, which overcomes the disadvantages of the heretofore-known devices and methods of this general type and which provides for a juicer that can be switched on and off in a simple manner.

With the foregoing and other objects in view there is provided, in accordance with the invention, a fruit juicer, comprising:

a centrally arranged, projecting and upwardly tapering element for pressing fruit disposed to be rotatable about an axis of rotation;

a drive train including a motor and an output shaft for driving the tapering element via toothed wheels;

an element connected to the tapering element and axially displaceable relative to the toothed wheels; and a switch connected for switching the motor and disposed to be actuated when the tapering element is depressed, and wherein the axially displaceable element is configured to actuate the switch in close vicinity of the axis of rotation.

In other words, the objects of the invention are achieved in a juicer of the type initially described, by the drive shaft being displaced in the axial direction and by the drive shaft being pressed against a switch means by depressing the element, by means of which the electromotor can be switched on.

Only through pressure on the element, exerted automatically by the user, if he would like to squeeze a citrus fruit, is an electrical contact made and the motor switched on at the same time. According to the present invention a simply constructed juicer including its drive can be put together. This advantage also enables easy assembly of the juicer during manufacture with minimal use of components, in particular rotating components.

A particularly preferred variant of a juicer is wherein the switch means comprises a key head and that a change lever or a rocker switch can be actuated by the drive shaft, through which the key head can be activated. The path traveled by the key head can be fixed by the change lever according to the principle of a one-armed lever, compared to the path, traveled by the drive shaft when depressed. Likewise, the rocker switch is pressed against a stop to prevent excessive pressing of the key head, by which the latter might be damaged or destroyed.

In another preferred embodiment the juicer has a compression spring, via which the drive shaft is mounted relative to a shaft bushing. A hub connected to the drive shaft laps over the compression spring, which is depressed onto the element when a force is applied.

The compression spring is preferably supported on a wear-plate.

Other features which are considered as characteristic for the invention are set forth in the appended claims.

Although the invention is illustrated and described herein as embodied in a juicer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
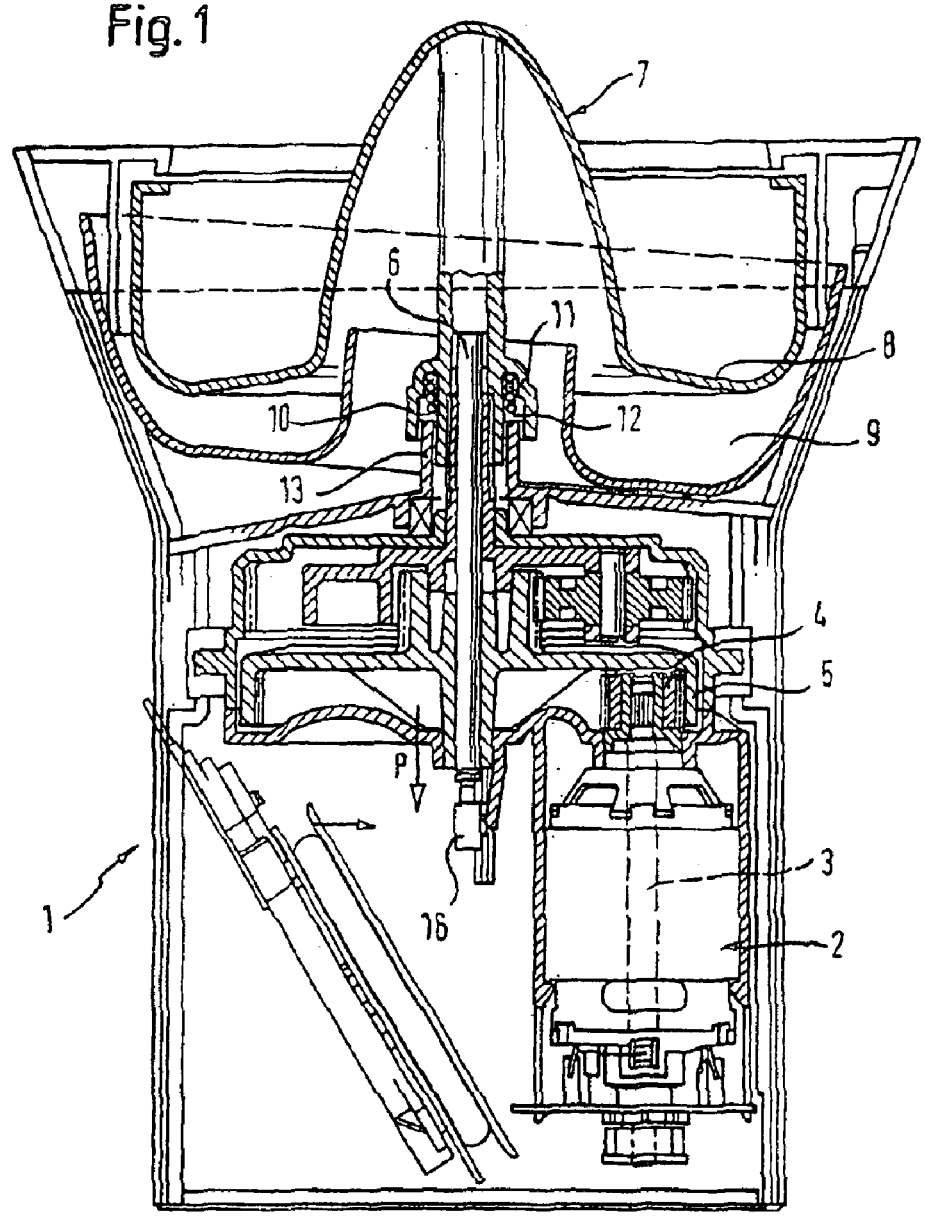
FIG. 1 is a longitudinal section through a juicer according to the invention.
Figure 2:
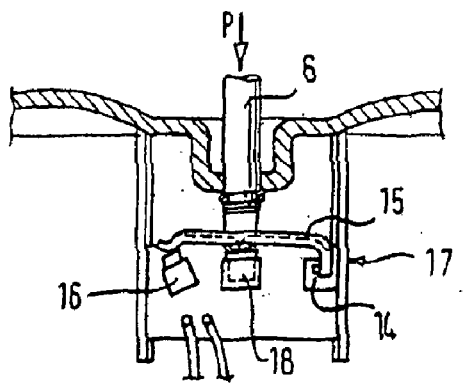
FIG. 2 is a partial sectional view of the juicer shown in FIG. 1, on an enlarged scale.

Referring now to the figures of the drawing in detail and first, particularly, to FIG. 1 thereof, there is shown a fruit juicer 1 or a fruit press 1 with an electromotor 2 that forms the drive motor. The motor 2 drives a drive shaft 3. Arranged on the drive shaft 3 at one end is a toothed wheel 4, which meshes with a toothed wheel 5.

The toothed wheel 5 is attached to a drive shaft 6. At its upper end the drive shaft 6 carries an element 7, which is designed substantially as a rotation paraboloid, as a cone, truncated cone, as a hemisphere, or as a combination thereof.

The element 7 bears ridges and in-between depressions, which aid in squeezing fruit. The expressed juice runs into a collection bin 8 rotating annularly about the element 7 and together with the latter via the drive shaft. The bin 8 is formed with slots, through which the juice runs into a stationary collection dish 9, while the fruit pulp collects in the bin 8.

The element 7 is connected on its underside to a hub 10. This is attached solidly to the drive shaft 6. The hub 10 lies on a shaft bushing 13 by way of a compression spring 11 and a wear-plate 12.

When fruit is laid on the element 7 to be squeezed, and a force is applied to the element 7, the latter is depressed along with the hub 10 and the drive shaft 6 against the recoil force of the compression spring 11, whereby the drive shaft 6 is moved downwardly in the direction of an arrow P.

On account of this axial movement the drive shaft 6 actuates a switch lever 15 attached to an attachment point 14 and arranged pivotably about its free end, so that the latter is pressed against a key 16. The key 16 is taken up by a housing bracket 17. When a switch contact is closed by means of the key 16 the electromotor 2 is actuated and the element 7 drives the toothed wheels 4 and 5 as well as the hub 10 via the drive shafts 3 and 6, along with the collection bin 8 to squeeze the juice out of the fruit.

By way of the invention a juicer 1 is provided, which is driven by an electromotor 2. The juicer 1 is fitted with a centrally arranged, projecting and upwards tapering element 7 for squeezing fruit. The juicer element is driven via a drive shaft 6 connected to the element 7. The drive shaft 6 can be displaced in the axial direction. When the element 7 is depressed the drive shaft 6 is pressed against a switch means 16 and the electromotor 2 is accordingly switched on.

The switch lever 15 can be depressed only as far as a stop 18. The stop is arranged such that on the one hand secure actuation of the key 16 is possible, but that on the other hand excessive pressing of the rocker switch 15 against the key 16 is prevented, which would damage or destroy the latter.

We claim:

1. A fruit juicer, comprising:
   a centrally arranged, projecting and upwardly tapering element for pressing fruit disposed to be rotatable about an axis of rotation;
   a drive train including a motor and an output shaft for driving said tapering element via toothed wheels;
   a drive shaft connected to said tapering element and axially displaceable relative to said toothed wheels;
   a switch connected for switching said motor and disposed to be actuated when said tapering element is depressed, and wherein said axially displaceable drive shaft being configured to actuate said switch in close vicinity of said axis of rotation.

2. The juicer according to claim 1, wherein said switch comprises a switch lever and a key, and said key is disposed to be actuated by said switch lever via said axially displaceable drive shaft.

3. The juicer according to claim 1, wherein said switch comprises a rocker and a key, and said key is disposed to be actuated by said rocker via said axially displaceable drive shaft.

4. The juicer according to claim 1, wherein said drive shaft carries a shaft bushing, and said tapering element is formed with a hub lapping over said shaft bushing.

5. The juicer according to claim 4, which comprises a compression spring mounted between said hub and said shaft bushing.

6. The juicer according to claim 5, wherein said compression spring is supported on a wear-plate.

7. The juicer according to claim 1, which comprises a device for preventing excessive pressing of said switch or said key.

8. The juicer according to claim 6, wherein said device is a stop.

9. A fruit juicer, comprising:
   an upwardly projecting and upwardly tapering element for pressing fruit mounted to be rotatable about an axis of rotation;
   a drive train including a motor connected to and selectively driving said tapering element;
   a drive shaft connected to said tapering element and axially displaceable relative to said drive train; and
   a switch connected for switching said motor, and disposed at or in close vicinity of said axis of rotation, for actuation by said axially displaceable drive shaft when said tapering element is depressed.

10. The fruit juicer according to claim 9, wherein said drive train includes a power output shaft of said motor, and a gear transmission with toothed wheels for transmitting drive power to said tapering element.

* * * * *